(No Model.)
A. S. SCHUYLER.
FLY TRAP.
No. 404,565. Patented June 4, 1889.
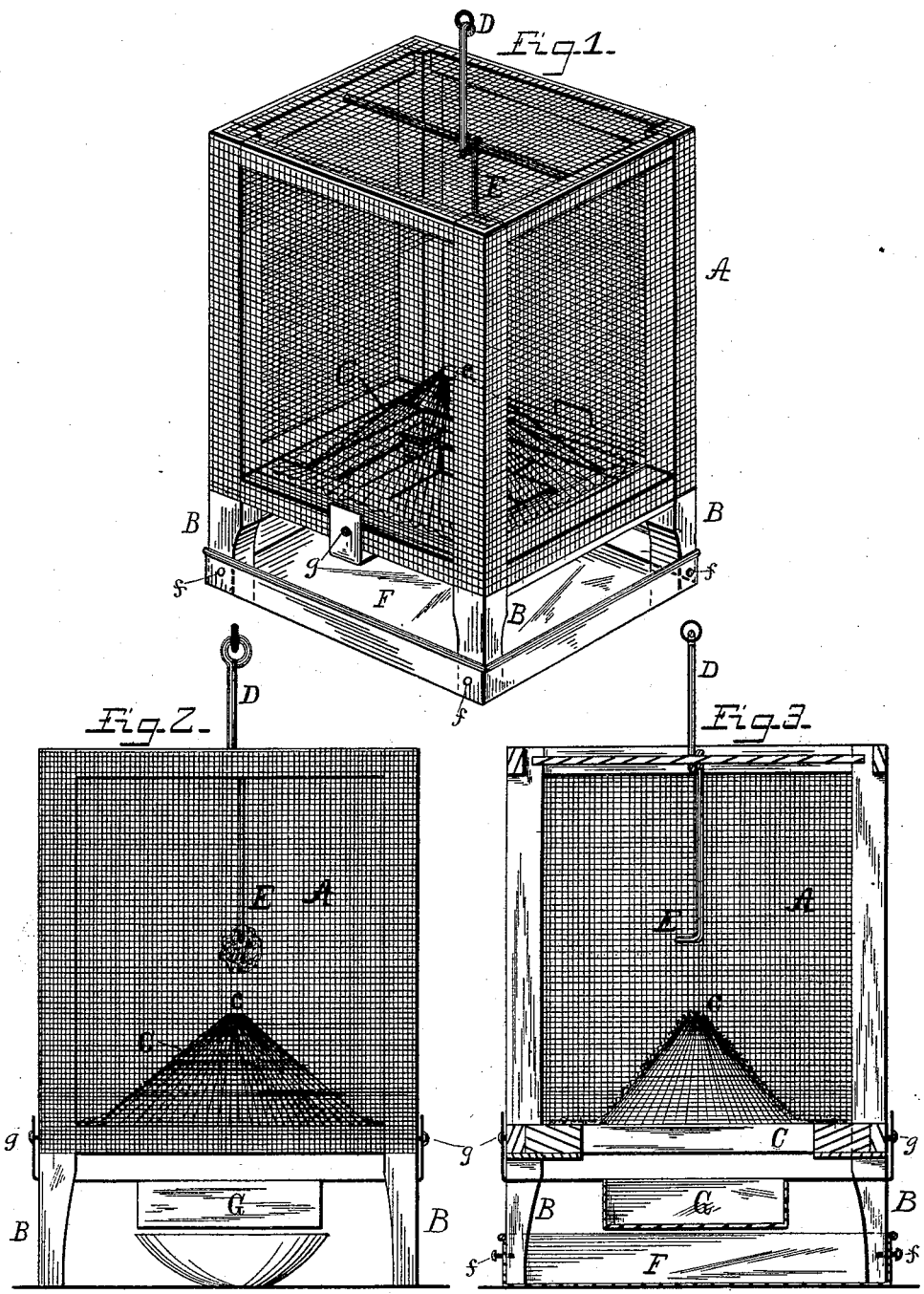
Witnesses,
John Bailey Johns
Wm. F. Brereton
Inventor,
Albert S. Schuyler
By V. W. Tallmadge, Attorney.

UNITED STATES PATENT OFFICE.

ALBERT SANFORD SCHUYLER, OF PENNINGTON, NEW JERSEY.

FLY-TRAP.

SPECIFICATION forming part of Letters Patent No. 404,565, dated June 4, 1889.

Application filed October 31, 1888. Serial No. 289,647. (No model.)

*To all whom it may concern:*

Be it known that I, ALBERT SANFORD SCHUYLER, a citizen of the United States, residing at Pennington, in the county of Mercer and State of New Jersey, have invented certain new and useful Improvements in Fly-Traps; and I do hereby declare the following to be a full, clear, and exact description of the invention, such as will enable others skilled in the art to which it appertains to make and use the same.

My invention is an improvement in fly-traps; and my said invention consists of a wire-gauze case, preferably of rectangular shape, adapted to be suspended by a hook, or stood upon its base, supplied with a removable cone-shaped entrance or bottom, and two removable bait-pans arranged one above the other and immediately below the entrance to the trap, all constructed and arranged as and for the purposes as will be hereinafter more fully described, and form the subject-matter of the annexed claim.

The object of this invention is to form a portable trap for flies that will be simple in construction, may be readily cleaned, and will be effective in action; and to accomplish this I proceed as follows, reference now being had to the accompanying drawings for a better understanding of the details of construction, and in which drawings—

Figure 1 is a view in perspective of a fly-trap constructed according to my invention, the same being held in its suspended position. Fig. 2 is a view in side elevation of the same with the lower bait-pan removed and the trap arranged over a dish or plate, and Fig. 3 is a sectional view.

A is the trap proper, preferably of rectangular shape, made of fine gauze-wire, and with legs or extensions B and a cone-shaped bottom C. This cone-shaped bottom is removably fitted within the interior lower end of the trap, and at the apex of said bottom is a small opening c to admit the flies. At the top of the trap, upon the outside, is arranged a hook D, by which the trap may be suspended, as shown in Fig. 1, and centrally within the trap, immediately below the hook D, is a bait-hook E, for the purposes as will presently appear.

At the bottom of the trap, and inclosing the legs thereof, is arranged a large shallow pan F, which is removably secured to said legs by pins or other suitable means, as at *f*, and above this pan, and just beneath the cone-shaped entrance to the trap, is a smaller pan G, also removably suspended in position by pins *g*.

The operation is as follows: If desired for setting upon the table, as in Fig. 2, over a dish or plate to draw the flies from said plate, the bottom pan F is removed and the small pan G only used. Suitable bait is now placed within the pan G, and also suspended upon the hook E within the trap. The flies will first be attracted to the pan F, and thence they will pass into the trap through the small opening c to reach the bait on hook E. When suspended by the hook D, the large pan F is used, which is also supplied with bait; or the trap may rest upon said pan F, as in Fig. 3, instead of over a dish, as in Fig. 2.

The bait-pan G is made somewhat smaller in area than the bottom of the cone C and pan F, and is placed sufficiently below said bottom and above the pan F so as not to obstruct the passage within the trap. The object of this small pan G is to draw the flies from the lower bait-pan F upward and within the cone C. The bait on hook E will then attract them, and in their effort to reach said bait they are entrapped.

The pans F and G are made removable, to facilitate cleaning and renewal of bait, and the object of having the two bait-pans arranged one above the other and the bait within the trap is to first by regular steps to attract the flies to the mouth of the trap and there insure their passage into said trap, because of the bait therein.

Having thus described my invention, I claim—

The combination, in a fly-trap, with the inclosed gauze-wire cage A, having legs B, removable cone-shaped bottom C, with opening c therein, suspending-hook D, and bait-hook E, of the bait-pan F, inclosing the bottom of the legs B, and bait-pan G, of smaller size than the pan F, and arranged between said pan F and the bottom C, and both of said pans F and G removably secured in position, as described, for the purposes specified.

In testimony whereof I affix my signature in presence of two witnesses.

ALBERT SANFORD SCHUYLER.

Witnesses:
THOMAS FARLEY,
MAYHEW DAVIS.